No. 608,891. Patented Aug. 9, 1898.
M. C. MORRISON.
VEHICLE BRAKE.
(Application filed Jan. 7, 1897.)
(No Model.) 2 Sheets—Sheet 1.
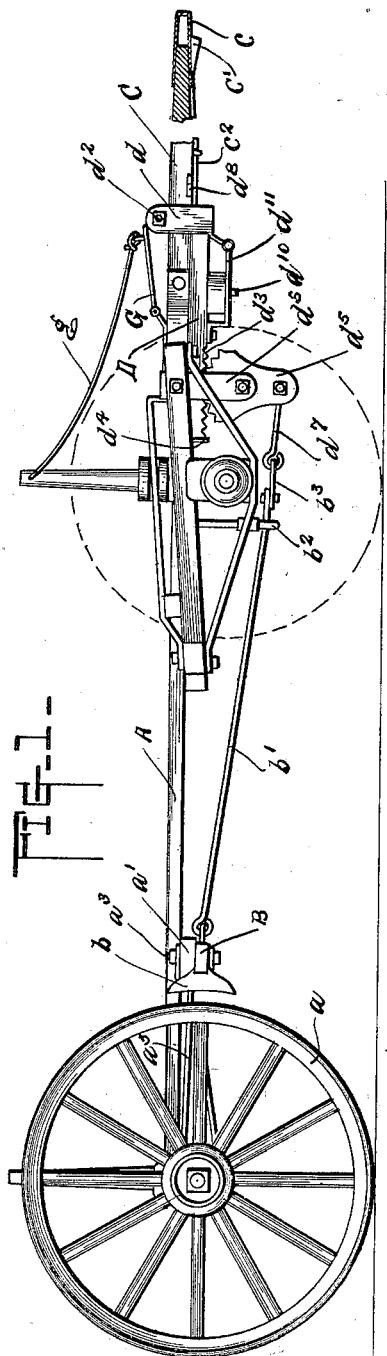
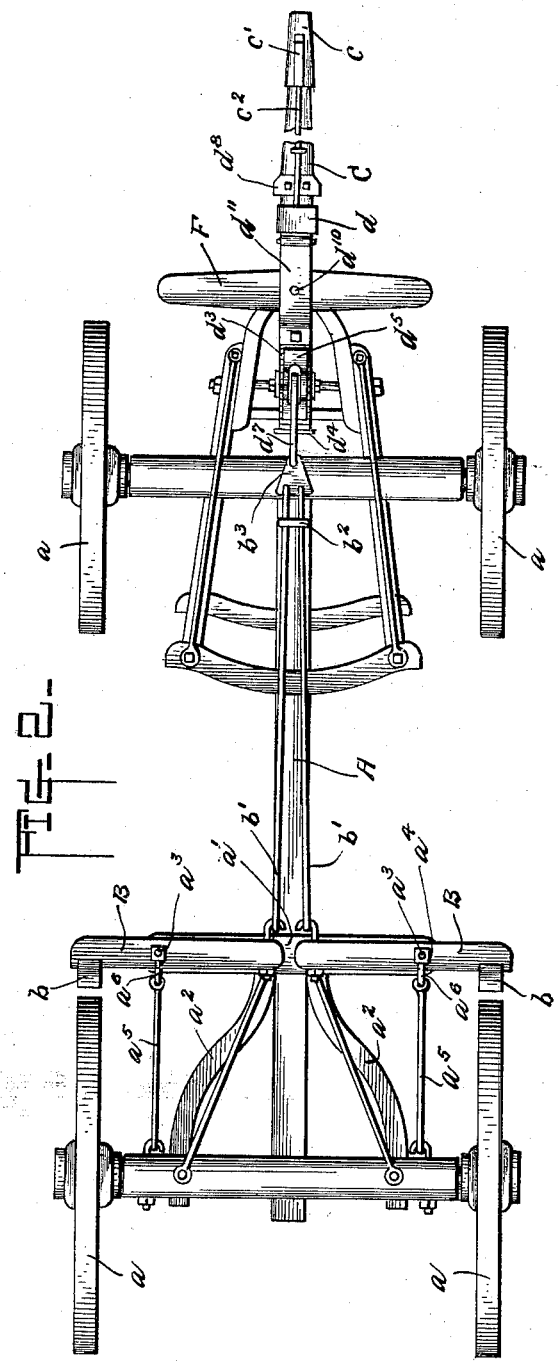
WITNESSES
INVENTOR
Myron C. Morrison,
By John Wedderburn
Attorney

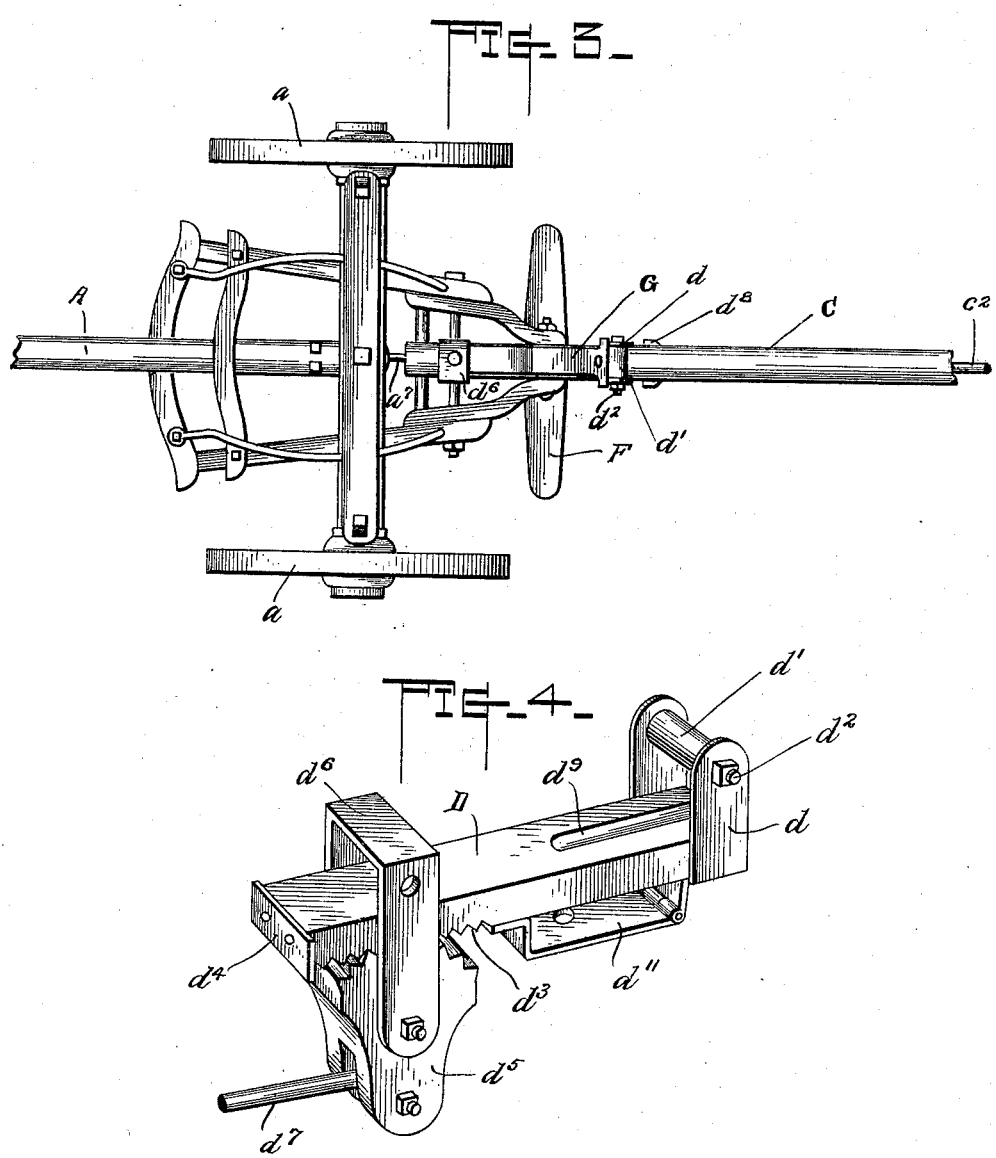

UNITED STATES PATENT OFFICE.

MYRON C. MORRISON, OF STOCKHOLM, NEW YORK.

VEHICLE-BRAKE.

SPECIFICATION forming part of Letters Patent No. 608,891, dated August 9, 1898.

Application filed January 7, 1897. Serial No. 618,334. (No model.)

*To all whom it may concern:*

Be it known that I, MYRON C. MORRISON, a citizen of the United States, residing at West Stockholm, in the county of St. Lawrence and State of New York, have invented certain new and useful Improvements in Vehicle-Brakes; and I do hereby declare the following to be a full, clear, and exact description of the invention, such as will enable others skilled in the art to which it appertains to make and use the same.

This invention relates to improvements in running-gear for vehicles, and has more particular relation to braking mechanisms for wagons.

The invention consists of certain novel constructions, combinations, and arrangements of parts, all of which will be hereinafter more particularly set forth and claimed.

In the accompanying drawings, forming part of this specification, Figure 1 represents a side elevation of a vehicle running-gear constructed according to my invention, the forward wheels being removed to more clearly expose the parts. Fig. 2 represents a bottom plan view of said running-gear. Fig. 3 represents a top plan view of the forward portion of said running-gear, and Fig. 4 represents an enlarged detail perspective view of the pole-slide and the toothed lever operated thereby.

A in the drawings represents the frame of the running-gear; B B, the pivoted levers; C, the pole of the running-gear, and D the sliding rod on said pole.

The frame A may be of any desired construction and material, according to the nature of the wagon desired, and is provided with the usual wheels $a$. Said frame is provided with a cross-bar $a'$, mounted thereon and braced by brace-bars $a^2$, connecting it with the rear axle. The levers B are pivotally mounted upon the respective opposite ends of said cross-bar $a'$ by pivot-pins $a^3$, secured by nuts $a^4$. The ends of said cross-bar $a'$ are further braced against any twisting strain by braces $a^5$, connected to the rear axle and to yokes $a^6$, which have their respective ends mounted on the opposite ends of the bolts $a^3$. Each of said levers B is provided at its outer end with a suitable brake-shoe $b$, adapted to engage the peripheries of the rear wheels $a$. The inner ends of said levers are pivotally connected to longitudinally-sliding bars $b'$, which pass forward through a suitable pendent guiding-yoke $b^2$, secured to the under side of the frame A. The forward ends of said rods $b'$ are pivotally mounted in a triangular plate $b^3$, said plate lying approximately under the center or pivotal point of the front axle, so that the movement of the front wheels from side to side will not affect the connecting-bars $b'$. The front end of the pole C is provided with a sliding sleeve $c$, formed upon its under side with a projection $c'$. This sleeve is adapted to receive the strap for connecting the pole to the neck-yoke, so that when the team hitched to the vehicle is pulled back upon steep grades the strain upon the neck-yoke will fall upon said sleeve $c$ and thus pull the same back upon the front end of the pole C. This sleeve $c$ is connected to the slide D, mounted upon the under side of the pole C, by a sliding rod $c^2$, mounted in suitable staples upon the under side of the pole. The said slide D is provided at its forward end with a supporting-yoke $d$, which passes upward upon the sides of the pole C, and is provided at its top with an antifriction-roller $d'$, secured therein by a bolt $d^2$ and adapted to rest upon the top of the pole C, so as to support the said slide upon said pole in such manner that it may move with a minimum amount of friction. The rear end of said slide D is provided on its under face with a plurality of gear-teeth $d^3$ and a cross-strip $d^4$. The said rear end of the slide is adapted to be supported by a segmental gear-lever $d^5$, pivotally mounted in a pendent yoke $d^6$, secured to the pole C. The upper segmental cog-surface of said lever $d^5$ is adapted to engage the teeth of the cogs $d^3$, so that when said slide D is moved longitudinally under the pole C said lever $d^5$ will be operated. The lower end of said lever $d^5$ is pivotally connected to the plate $b^3$ by a pivoted link $d^7$, so that upon the movement of said lever $d^5$ said plate $b^3$ is also operated, which communicates movement to the rods $b'$ and levers B, and thus applies the brake-shoes $b$ to the wheels. The stop $d^4$ is adapted to contact with the rear edge of the yoke $d^6$, and thus limit the forward movement of said slide D. As an additional stop a cross-strip $d^8$ is mounted upon the under side of the pole C, so as to project to each side of the same, so that it will be struck by the yoke $d$ when it has reached its forward position. The rod $c^2$ is preferably mounted in a shallow groove in the bottom of the pole C and is connected to the slide D by being passed downward through an aperture $d^9$, formed therein, so as to leave a pendent end $d^{10}$. A hinged apertured plate $d^{11}$ is secured at one end to the slide D and is adapted to be turned down over the projecting end $d^{10}$ after the doubletree F has been applied on said pin. The plate $d^{10}$ thus holds the doubletree firmly upon said pin, but permits of a pivotal action of the same.

It will thus be observed that the forward pull of the draft-animals will cause the slide D to pass forward until it contacts with the stop $d^8$, thus moving the brake-shoes from the wheel, whereas a reverse or braking action of the animals will cause the slide D to move rearwardly, and thus apply the brakes. In order to lock the braking mechanism against action when so desired, I provide the top of the pole C with a hinged stop-plate G, provided with an operating-cord $g$, whereby it may be raised when so desired. This plate is adapted to lie normally in the path of the upwardly-protruding ends of the yoke $d$, and thus prevent the rearward movement of said yoke. When it is desired to permit the brake to operate, a pull upon the cord $g$ will raise said plate G, and thus permit the yoke $d$ and slide D to slide freely to the rear.

It will be observed from the foregoing description that the operation of my improved brake is incidental to the natural movements of the draft-animals and the brake-shoes are applied or removed from the rear wheels, according to whether the animals are pulling or holding back. Should it be desired to back the wagon, the plate G is simply lowered, so as to prevent the rear movement of the slide, while the wagon may be rolled rearwardly without applying the brakes.

It will further be observed that the degree of power with which the brake-shoes are applied is regulated according to the grade. For instance, should the grade be exceedingly steep the brake pull of the draft-animals will be correspondingly greater, and thus the brake-shoes will be forced more firmly against the rear wheels with a consequential braking action.

It will also be observed that no springs are employed in my improved construction of brake, as the brake-shoes are removed or applied by the forward pull or holding back of the draft-animals.

While the construction and operation of this improved braking mechanism are very simple and cheap, it at the same time is very effective, as the holding back of the draft-animals applies the brakes with much better effect than the same could be applied by hand and without any effort on the part of the driver.

Having thus described my invention, what I claim as new, and desire to secure by Letters Patent, is—

1. In braking mechanism for vehicles, the combination of pivoted levers mounted upon the frame, and carrying brake-shoes, a sleeve slidingly mounted upon the forward end of the pole, a slide upon the rear end of the pole having cog-teeth, a sliding rod connecting said slide and sleeve, a pivoted lever having a segmental face provided with cog-teeth adapted to engage the teeth on the slide, and connections between said lever and the levers carrying the brake-shoes, as and for the purpose set forth.

2. In a braking mechanism, the combination with the running-gear proper, of levers pivotally mounted upon the frame of the same and carrying brake-shoes, a slide mounted at the rear of the pole, a supporting-roller connected to said slide and adapted to rest upon the top of the pole, rack-teeth formed on said slide, a rod connected to said slide and extending to the forward end of the pole for attachment to the harness, a pivoted lever having rack-teeth adapted to engage the teeth of the slide, and means connecting said lever with the pivoted brake-shoe levers, substantially as described.

3. In a braking mechanism, the combination with the running-gear proper, of levers pivotally mounted upon the frame of the same and carrying brake-shoes, a sliding sleeve mounted upon the forward end of the pole, a slide having rack-teeth mounted upon the rear of the pole, a hinged doubletree-supporting frame mounted on said slide, a rod connecting said slide with the sleeve at the forward end of the pole, a doubletree mounted in the hinged supporting-frame, a pivoted lever having rack-teeth adapted to engage the teeth of the slide, and means connecting said lever with the pivoted brake-shoe levers, substantially as described.

In testimony whereof I have signed this specification in the presence of two subscribing witnesses.

MYRON C. MORRISON.

Witnesses:
VIVA C. STEARNS,
FRANCES A. STEARNS.